United States Patent [19]

Nishikawa

[11] Patent Number: 5,513,364
[45] Date of Patent: Apr. 30, 1996

[54] DATA TRANSFER DEVICE AND MULTIPROCESSOR SYSTEM

[75] Inventor: Junji Nishikawa, Osaka, Japan

[73] Assignee: Matsushita Electric Industrial Co., Ltd., Osaka, Japan

[21] Appl. No.: 205,417

[22] Filed: Mar. 3, 1994

[30] Foreign Application Priority Data

Mar. 9, 1993  [JP]  Japan ................................ 5-047606

[51] Int. Cl.⁶ .................................................. G06F 13/00
[52] U.S. Cl. ............................................ 395/287; 395/405
[58] Field of Search ................................. 395/425, 325, 395/700, 257, 405

[56] References Cited

U.S. PATENT DOCUMENTS

| | | | |
|---|---|---|---|
| 4,514,807 | 4/1985 | Nogi | 364/200 |
| 4,855,903 | 8/1989 | Carleton et al. | 395/325 |
| 5,134,695 | 7/1992 | Ikeda | 395/425 |

FOREIGN PATENT DOCUMENTS 56-17458  2/1981  Japan.

*Primary Examiner*—Jack B. Harvey
*Assistant Examiner*—David A. Wiley
*Attorney, Agent, or Firm*—Willian Brinks Hofer Gilson & Lione

[57] ABSTRACT

In a data transfer control device for controlling a data transfer bus connected to plural buffer units, an address generation circuit for specifying a buffer unit address is provided with an address register for holding upper and lower limit values of the buffer unit address, an address counter which sequentially increments the buffer unit address, starting from the lower limit value, and a comparator for judging whether an output of the address counter reaches to the upper limit value. The data transfer control device composes a crossbar-type data transfer network together with the buffer units, and plural processor elements or plural I/O devices are connected to the network.

29 Claims, 21 Drawing Sheets

THREE-DIMENSIONAL ARRAY
A(1:4,1:4,1:4)

DISTRIBUTION
IN X DIRECTION
A(1:4,/1:4,1:4/)

DISTRIBUTION
IN Y DIRECTION
A(1:4/,1:4,/1:4)

DISTRIBUTION
IN Z DIRECTION
A(/1:4,1:4/,1:4)

5,513,364

DATA TRANSFER DEVICE AND MULTIPROCESSOR SYSTEM

BACKGROUND OF THE INVENTION

This invention relates to a data transfer device for transferring data between processor elements and for transmitting and receiving data between any one of the processor elements and outside in a multiprocessor system for parallel processing using a plurality of processor elements.

Recently, accompanied by large-scaled data processing, high-performance computer systems are required. In a parallel computer, a plurality of processor elements share processings in order to enhance the performance. In general, the parallel processing requires data transfer between the processor elements, associated by proceedings of the processings in the plural processor elements. Various kinds of interconnection networks (data transfer networks) are proposed for communication among such processor elements. Among them, a crossbar-type network is a complete interconnection network which can perform communication among arbitrary processor elements by one time data transfer.

FIG. 22 shows a construction of a conventional multiprocessor system in which the plural processor elements (PE) are connected by a crossbar-type network. In the figure, reference numeral 50 indicates a processor element on transmission side, 55 indicates a processor element on receiving side, 60 indicates a data transfer control device on transmission side, 65 indicates a data transfer control device on receiving side, and 70 indicates a buffer unit as a data transfer channel (joint node).

How to achieve the crossbar-type network logically expressed as in FIG.22 on an actual hardware depends on respective parallel computers. Also, a sequence for accessing the network according to the proceeding stage of the processing depends on the contents to be processed. FIG.23 shows an example of the buffer unit 70 of FIFO-type (first-in-first-out buffer 71). The processor element 50 on transmission side can transmit data to the channel of the FIFO buffer 71 during the time when the FIFO buffer 71 has a vacant. The processor element 55 on receiving side reads the data from the non-vacant FIFO buffer 71. Accordingly, different from a case where the joint node is composed of a mere switch, setting of the joint condition of whole network is unnecessary.

Shown in FIGS. 24 and 25 is an example of generation of a buffer unit address (channel number) for specifying a target address to which a data is to be transmitted in the construction shown in FIGS. 22 and 23. FIG. 24 shows a construction of a conventional address generation circuit 61 built in the data transfer control device 60 on transmission side. In FIG.24, the address generation circuit 61 includes an n-bit pointer 62 and a +1 adder 63. Under this construction, when data is transmitted from the processor elements 50 on the transmission side to the processor elements 55 on the receiving side, a buffer unit address A held in the n-bit pointer 62 is incremented according to an address update requirement signal CNT per data transfer to sequentially specify target channel numbers, as shown in FIG.25. This is called "burst transfer", which requires only pulses as the CNT signal without additional time for specifying the channels. Thus, the data transfer rate is high.

In the address generation circuit 61 in FIG.24 in the conventional data transfer device, if the n-bit pointer 62 has two bits, only n-power of 2 is counted, such as 0, 1, 2, 3, 0, 1, 2, 3... Therefore, variation range of the address is fixed and the address generation is limited to sequential generation.

Consequently, the multiprocessor system using the data transfer network in which the size is fixed by such a reason cannot optimize the network size to contents to be processed, so that the parallel processing rate is lowered. Further, in the case where the processor elements are grouped and data transfer with a different purpose at every group is to be conducted, the burst transfer is not available. This means that another data transfer method with low transfer rate must be employed.

Moreover, in the multiprocessor system using the data transfer network which generates only sequential addresses as mentioned above, for example, three-dimensional array data are processed with low efficiency, because skip address values often occur in case of data distribution and collection in the multiprocessor system.

SUMMARY OF THE INVENTION

This invention has its object of enhancing a processing efficiency of a multiprocessor by employing a programmable address generation mechanism.

To attain the object, in the present invention, an upper limit and a lower limit of a buffer unit address are restricted and an increment thereof is made changeable.

According to the present invention, the restriction of upper and lower limits of the buffer unit address makes a network dividable, thus enhancing the processing efficiency of the multiprocessor system. By limiting the address variation range, data transfer between processor elements and data transfer between the processor elements and a data input/output devices can be selected optionally.

In addition, by changing the increment, skip address values can be easily generated in high speed, which enables efficient generation of target address or source address of the network suitable for data construction of more than three-dimension.

BRIEF DESCRIPTION OF ACCOMPANYING DRAWINGS

DETAILED DESCRIPTION OF PREFERRED EMBODIMENTS

Description is made below of preferred embodiments of the present: invention, with reference to accompanying drawings.

(FIRST EMBODIMENT)

Figure 1:
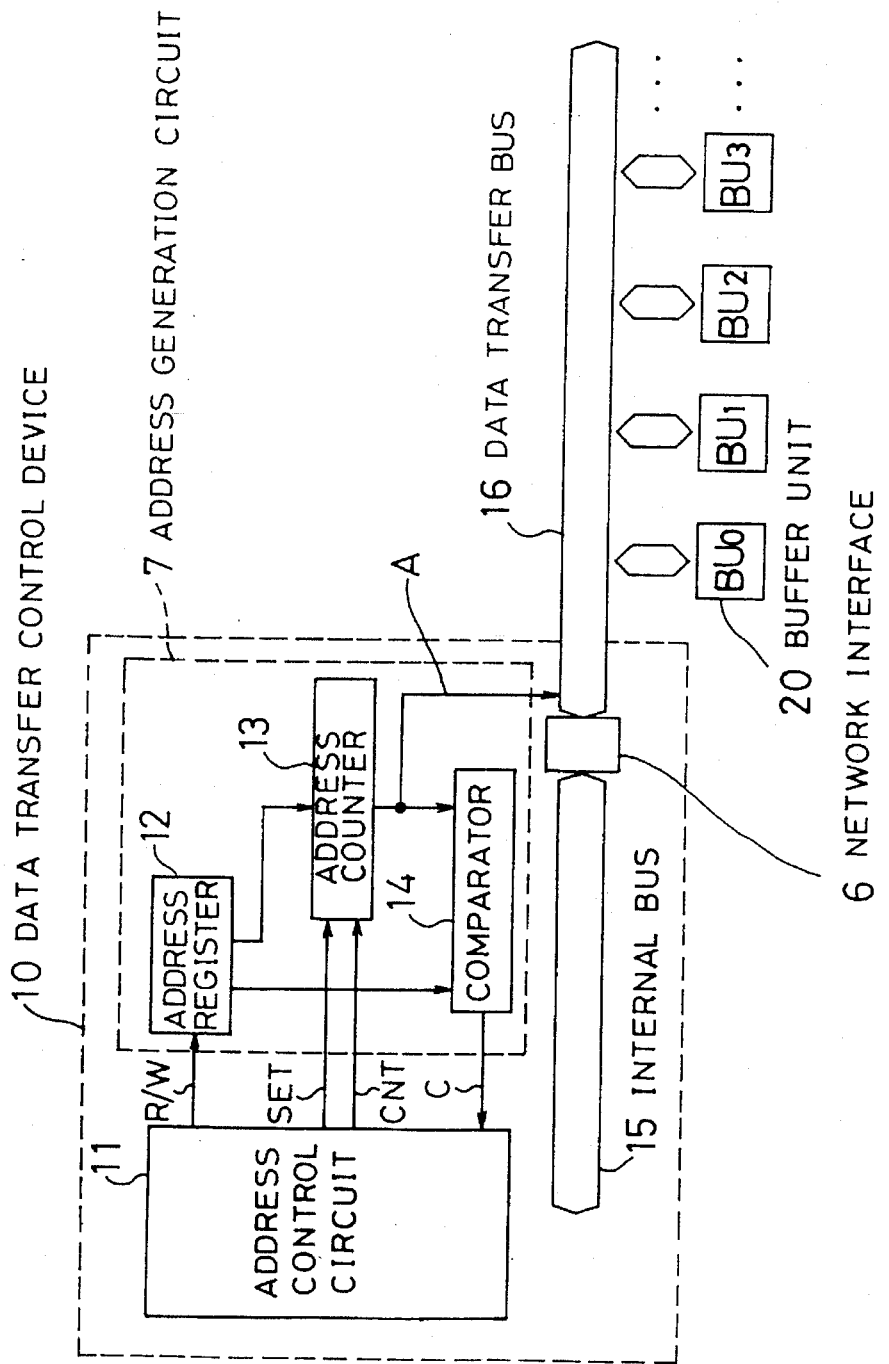
FIG. 1 is a diagram showing a construction of a data transfer device according to embodiments of the present invention.

FIG. 1 shows a construction of a data transfer device according to the embodiments of the present invention. A data transfer control device 10 and buffer units (BU) 20 of K in number are interconnected by a data transfer bus 16. The data transfer control device 10 includes an address register 12, an address counter 13, a comparator 14, a network interface 6, an internal bus 15 and an address control circuit 11 for controlling them. The address register 12, the address counter 13 and the comparator 14 compose an address generation circuit 7. R/W indicates a register setting signal for controlling address setting from a processor element (not shown in FIG. 1) to the address register 12. SET and CNT are respectively an address setting signal and an address update requirement signal to the address counter 13. C indicates a conformity signal from the comparator 14. A buffer unit address to be sent out to the data transfer bus 16 is indicated by A.

Figure 2:
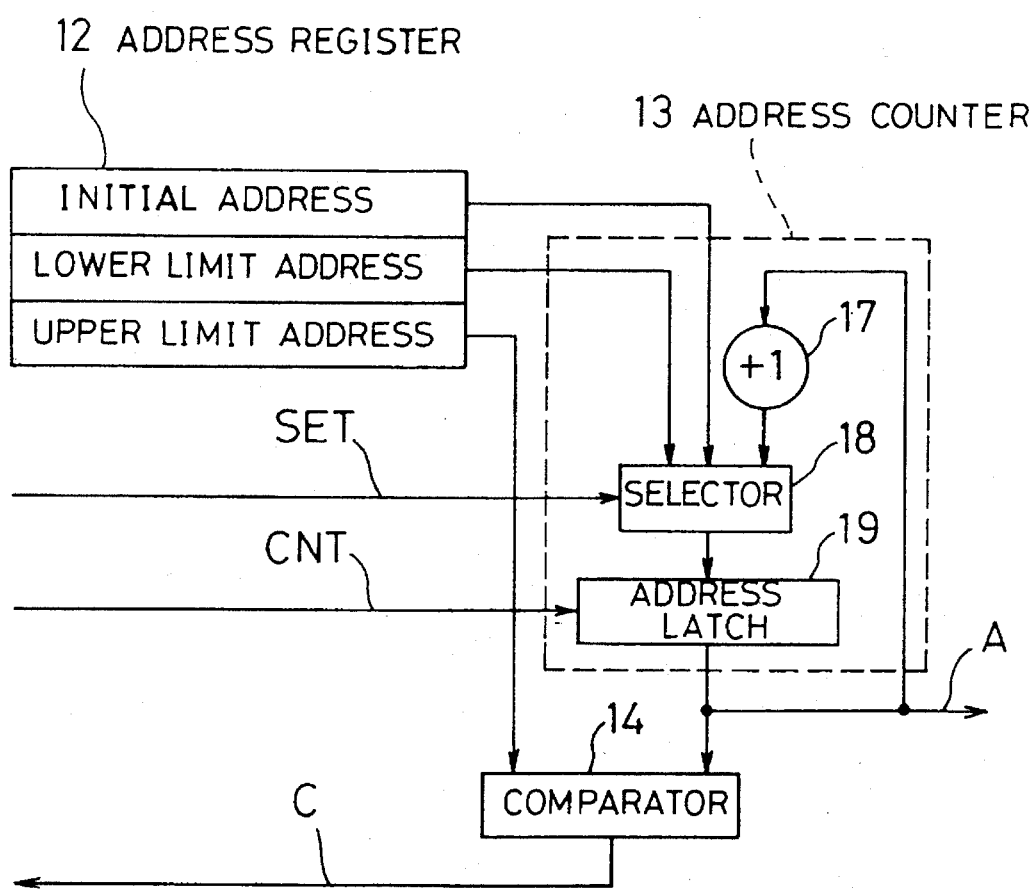
FIG. 2 is a diagram showing a construction of an address generation circuit in FIG. 1.

FIG. 2 shows an inside construction of the address generation circuit 7. The address register 12 holds three addresses: an initial address, a lower limit address and an upper limit address. The address counter 13 includes a +1 adder 17, a selector 18 and an address latch 19. The selector 18 selects, according to the address setting signal SET, one of the three addresses of the initial address, and the lower limit address from the address register 12, and an address after increment by the +1 adder 17. An output of the selector 18 is inputted to the address latch 19. A value A held by the address latch 19 is address-outputted to each buffer unit 20. An output A of the address latch 19 and the upper limit address from the address register 12 are inputted to the comparator 14. The comparator 14 compares the two values and returns to the address control circuit 11 a compared result as a conformity signal C.

Figure 3:
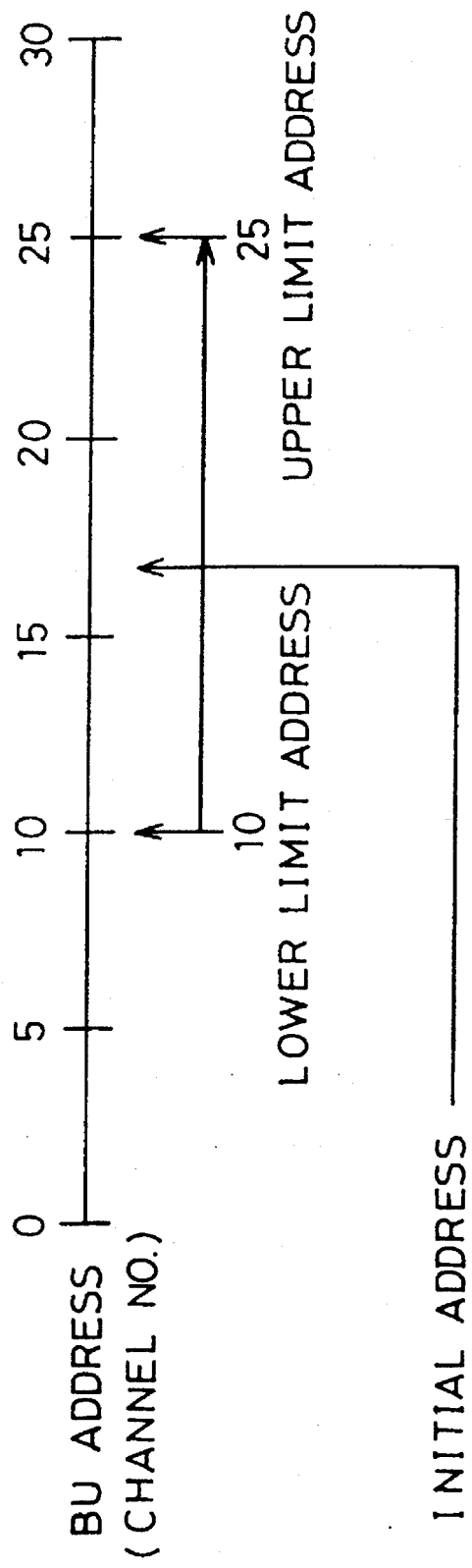
FIG. 3 is a diagram showing an example of generation of buffer unit address by the address generation circuit in FIG. 2.

Described next is operation of the data transfer device with the above construction. FIG. 3 shows an example of address setting. First, the initial address (e.g., 17) of the address register 12 is selected by the selector 18 and stored into the address latch 19, and the buffer unit address A is set to the initial address. Then, the data transfer is conducted to the buffer unit 20 specified by the address A. Next, the selector 18 is exchanged to select an output of the +1 adder 17, and the address update requirement signal CNT is provided to the address latch 19 at every data transfer, thus the addresses held in the address latch 19 are sequentially incremented. The burst transfer is performed by sequentially changing the address by the CNT signal when data are successively transmitted to the buffer unit 20. When the address held in the address latch 19 reaches to the upper limit address (e.g., 25), the conformity signal C is outputted from the comparator 14. At this time, the selector 18 is exchanged to select the lower limit address (e.g., 10) according to the address setting signal SET to store the lower limit address into the address latch 19. Thereby, the address held by the address latch 19 returns to the lower limit address after data transfer regarding the upper limit address. In this way, as shown in FIG. 3, addresses which are sequentially changed between the lower limit address and the upper limit address are generated starting from the initial address.

According to the data transfer device in this embodiment, by providing the address generation circuit 7 which specifies lower and upper limits of the buffer unit addresses and accesses sequentially, the burst transfer to a part (one group) of the buffer units 20 of K in number as targets to which data is to be transmitted can be conducted. With respect to buffer units of different groups, the data transfer between the buffer units belonging to a group can be conducted by rewriting the address in the address register 12, which facilitates the exchange of the target.

Figure 4:
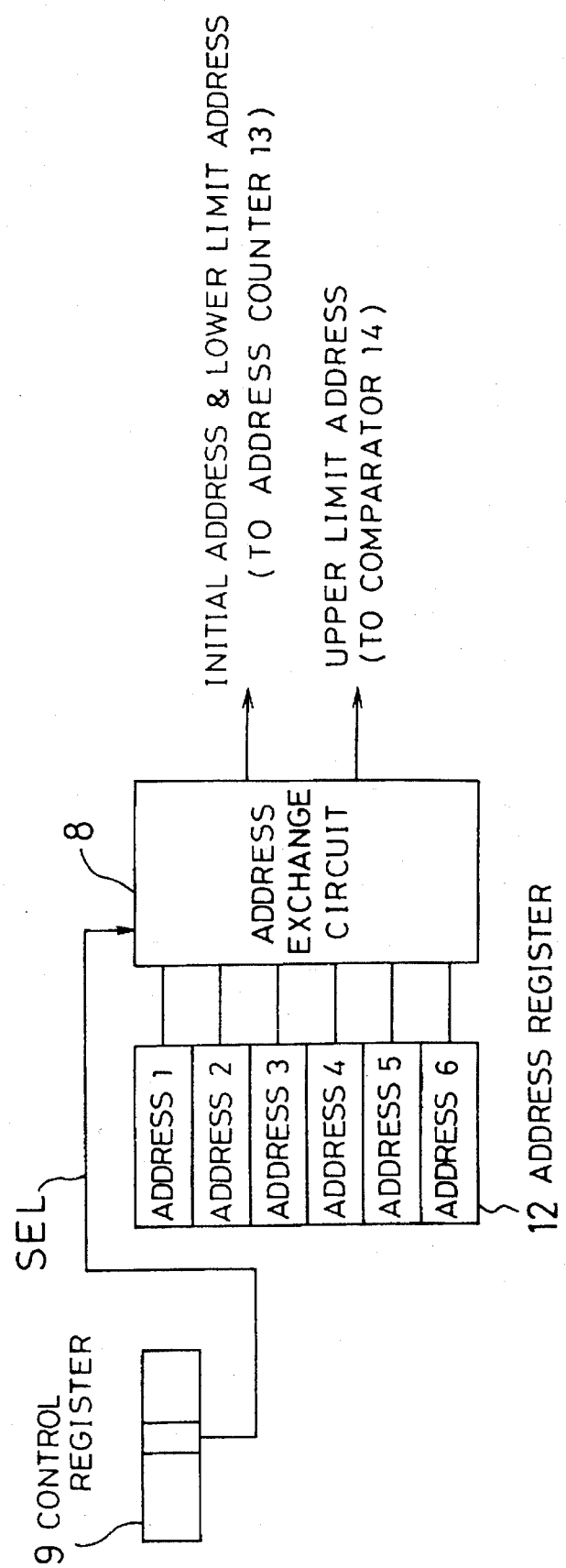
FIG. 4 is a diagram showing a modified example of the address generation circuit in FIG. 2.

As shown in FIG. 4, an address exchange circuit 8 exchanged according to a selection signal SEL from the control register 9 may be added to the address register 12. The buffer units 20 of K in number are divided into some groups, plural pairs of initial, lower limit and upper limit addresses per group are stored in the address register 12, and one of the pairs are selected. Thus, the buffer unit to be a target of the data transfer can be easily exchanged.

Further, the address update requirement signal CNT may be generated every time when a plurality of data are transmitted. Thereby, the packet transfer can be conducted. In the above case, the +1 adder 17 is used in the address counter 13. However, when the +1 adder is changed to a −1 adder, the burst transfer that the address is sequentially decreased from the upper limit to the lower limit is possible.

Figure 5:
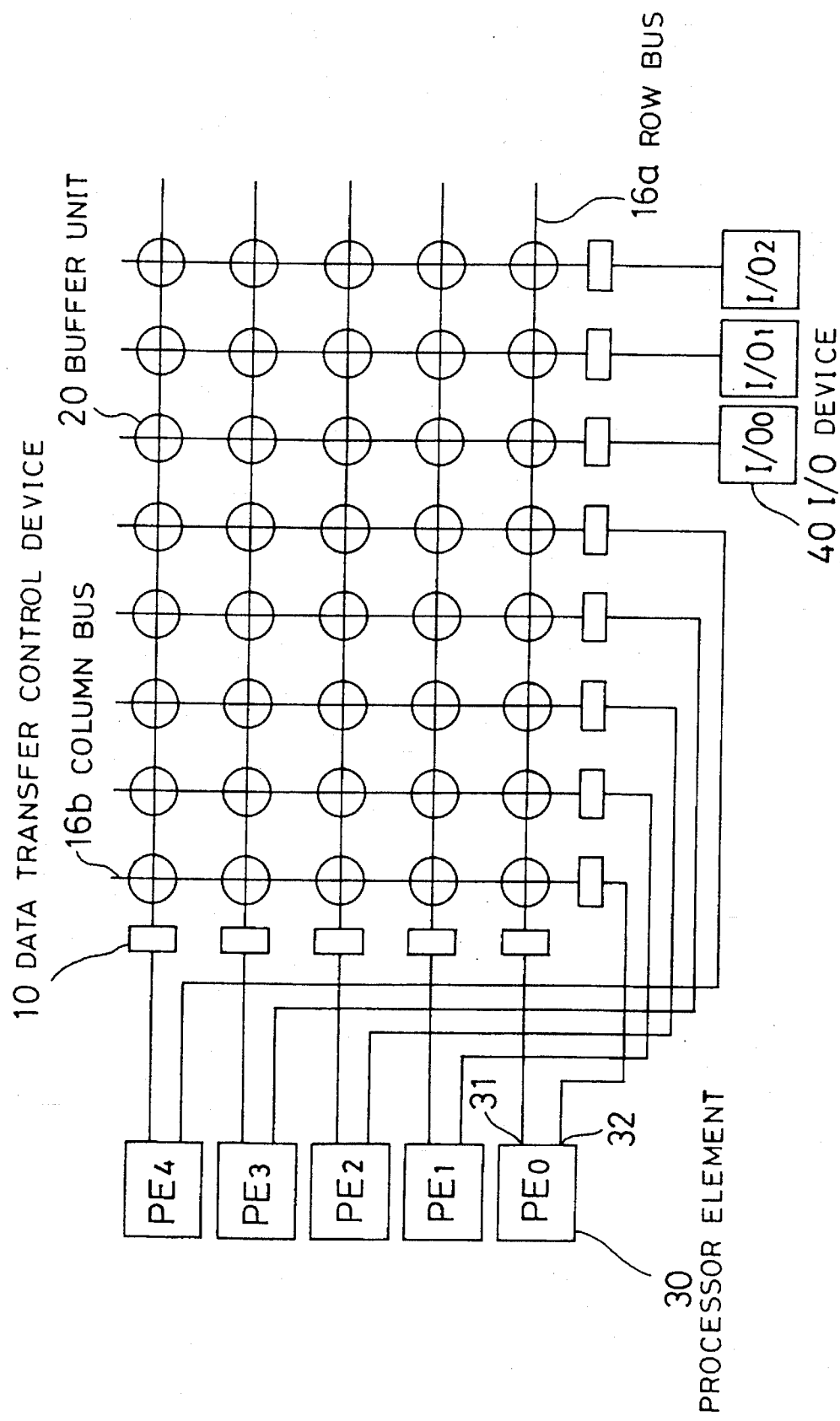
FIG. 5 is a diagram showing a construction of a multiprocessor system utilizing the construction in FIG. 1.

Next, the construction of a multiprocessor system using the above data transfer device is discussed, with reference to FIG. 5. In FIG. 5, the buffer units (BU) 20 are 5×8 (=40) in number and the data transfer control devices 10 are 5+8 (=13) in number which are shown in FIG. 1 are arranged so as to compose a crossbar-type data transfer network. Five row buses 16a are respectively connected to first data transfer ports 31 of the processor elements (PE). Eight column buses 16b are respectively connected to second data transfer ports 32 of the processor elements 30 and I/O devices 40.

Figure 6:
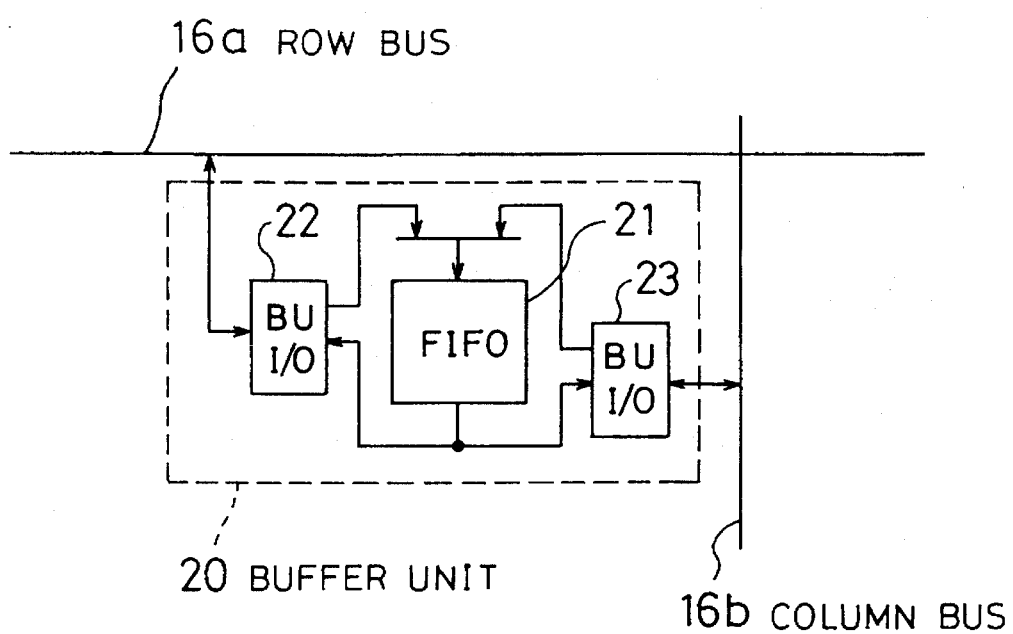
FIG. 6 is a diagram showing one of buffer units in FIG. 5.

One of the buffer units (BU) 20 is shown in FIG. 6 which is located at a crossing point of the row bus 16a and the column bus 16b. Two ports 22, 23 respectively connected to the row bus 16a and the column bus 16b and a FIFO memory 21 are connected via paths for transferring data in two ways.

Hereinafter discussed is data transfer operation in the above multiprocessor system. The processor element 30 transmits data to the buffer unit 20 in a range specified by the address register 12 (FIGS. 1 and 2). In case where each processor element 30 generates addresses from 0 to 4, the data transfer is conducted among the five processor elements 30 mutually. When the address setting is changed per group of the processor elements 30, the data is transferred within a group in the set address range. For example, the lower limit address and the upper limit address of two processor elements (PE0, 1) are respectively set to 0 and 1, and the lower limit address and the upper limit address of the other three processor elements (PE2, 3, 4) are respectively set to 2 and 4. At this time, the processor elements 30 are divided into two groups so that the mutual data transfer is executed within the respective groups. When the lower limit address and the upper limit address of each processor element (PE0-4) are respectively set to 5 and 7 and the lower limit address and the upper limit address of the three I/O devices 40 are set to respectively 0 and 4, the data transfer between the processor elements 30 and the I/O devices 40 become possible.

Such address generation makes it possible to optionally increase the numbers of processor elements and I/O devices, and only required for changing a target to which a data is to be transmitted is the change in address range by a software. With the buffer unit 20 shown in FIG. 6, the two-way data transfer can be performed.

As described above, according to the above multiprocessor system, with the address generation circuit 7 (FIG. 1) specifying the address range and sequentially accessing, the processor elements 30 are grouped and mutual data transfer per group can be performed. Hence, efficient parallel processing can be performed, dividing the data transfer network into optimum size according to the content to be processed. The data transfer between the processor elements 30 and the I/O devices 40 can be easily executed. In addition, the network can be easily expanded since the address range is specified.

It is possible that eight row buses 16a and five column buses 16b are arranged and three row busses 16a out of eight are respectively connected to I/O devices 40 via data transfer control devices 10. Both numbers of row buses 16a and column buses 16b can be larger than the number of processor elements 30. In this case, the data transfer between the I/O devices 40 and either port 31, 32 of the processor elements 30 becomes possible.

Figure 7:
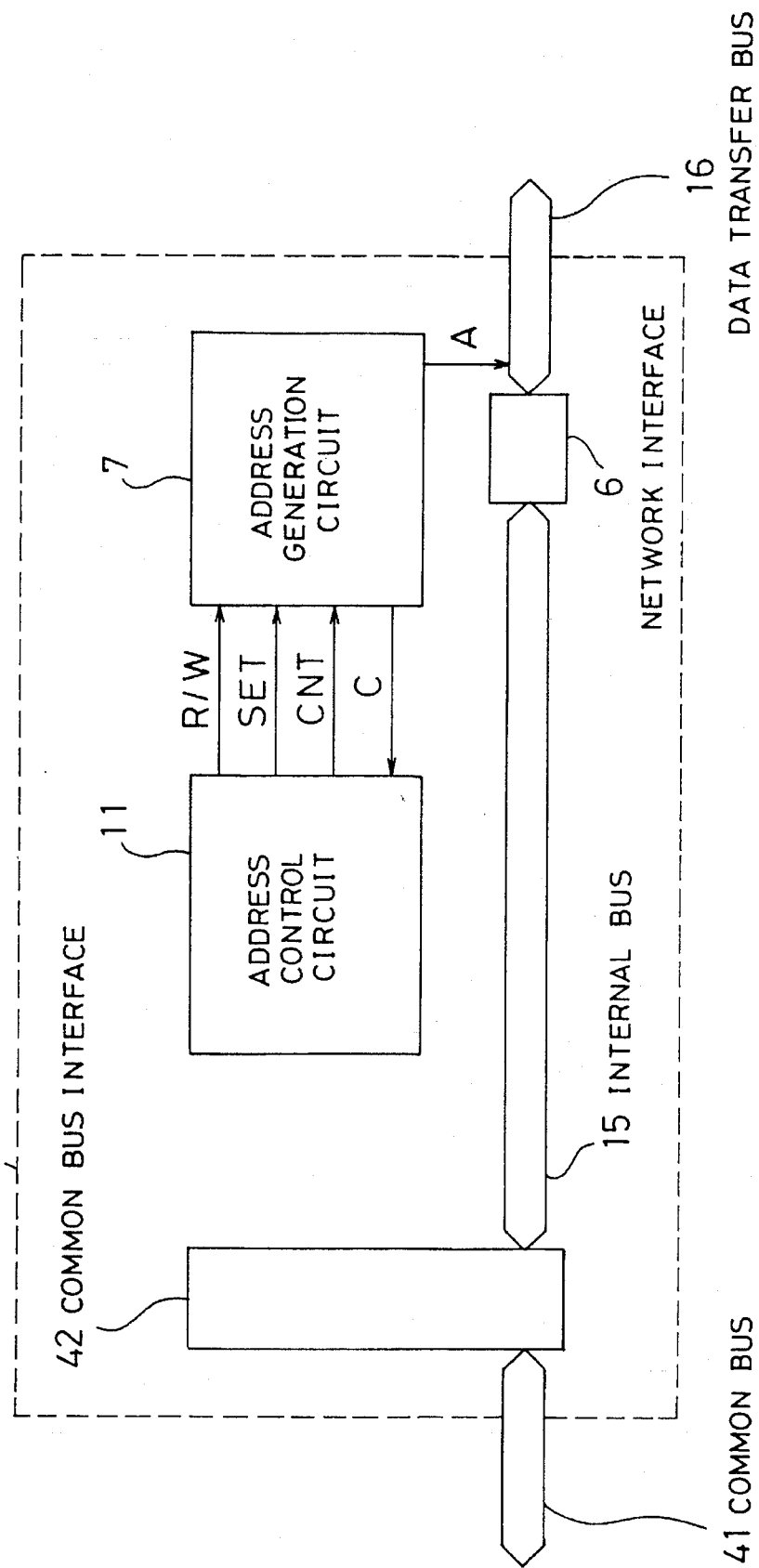
FIG. 7 is a diagram showing a modified example of a data transfer control device in FIG. 1.
Figure 8:
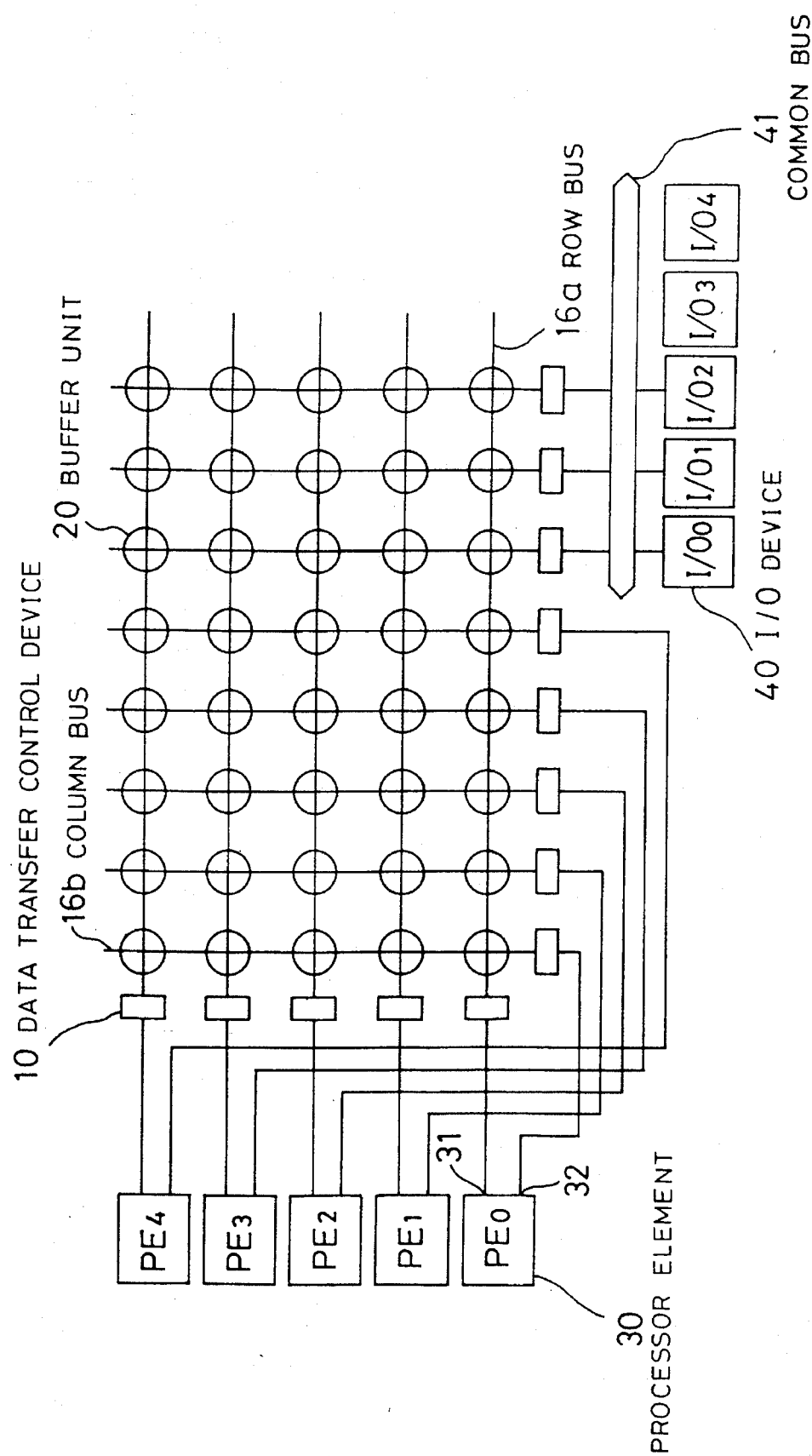
FIG. 8 is a diagram showing a construction of a multiprocessor system utilizing the data transfer control device in FIG. 7.

In FIG. 7, a common bus interface 42 for connecting the internal bus 15 to a common bus 41 is added to the data transfer control device 10 in FIG. 1. As shown in FIG. 8, it is possible that, for example, three data transfer control devices 10 are connected to one common bus 41 and the five I/O devices 40 are connected to the common bus 41. According to the construction shown in FIG. 8, the I/O devices can be easily increased in number without the buffer units of the network increased in number.

(SECOND EMBODIMENT)

Figure 9:
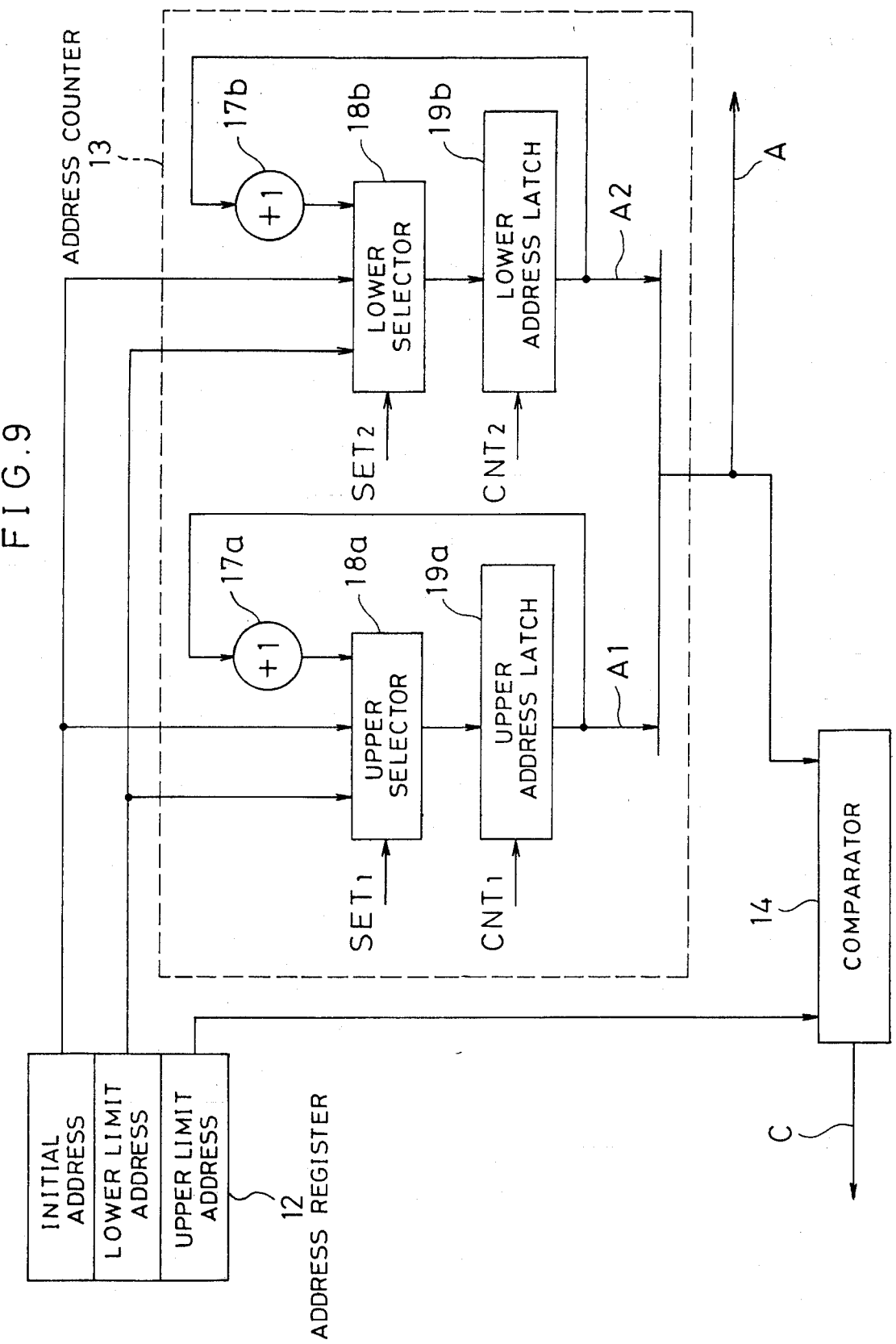
FIG. 9 is a diagram showing another modified example of the address generation circuit in FIG. 2.

Another example of the address generation circuit in the data transfer control device used in the multiprocessor system is shown in FIG. 9. The address counter 13 of the address generation circuit in FIG. 9 includes two +1 adders 17a, 17b, an upper selector 18a, a lower selector 18b, a two-bit upper address latch 19a, and a two-bit lower address latch 19b. The upper selector 18a selects, according to a SET1 signal, one among upper two bits of the initial address of the address register 12, upper two bits of the lower limit address of the address register 12 and an output of the +1 adder 17a to provide the selected one to the upper address latch 19a. On the other hand, the lower selector 18b selects, according to a SET2 signal, one among lower two bits of the initial address of the address register 12, lower two bits of the lower limit address of the address register 12 and an output of the +1 adder 17b to provide the selected one to the lower address latch 19b. Further, the upper address latch 19a and the lower address latch 19b are independently updated by CNT1 signal and CNT2 signal respectively. An output A1 of the upper address latch 19a and an output A2 of the lower address latch 19b are synthesized to be a four-bit buffer unit address A.

Discussed next is the data transfer operation between the processors with respect to three-dimensional array by the address generation circuit in FIG. 9, referring to FIGS. 10–16. A total number of the processor elements 30 are n×n, wherein n is a constant of 2's power. In the following description, n is supposed to be 4.

Figure 10:
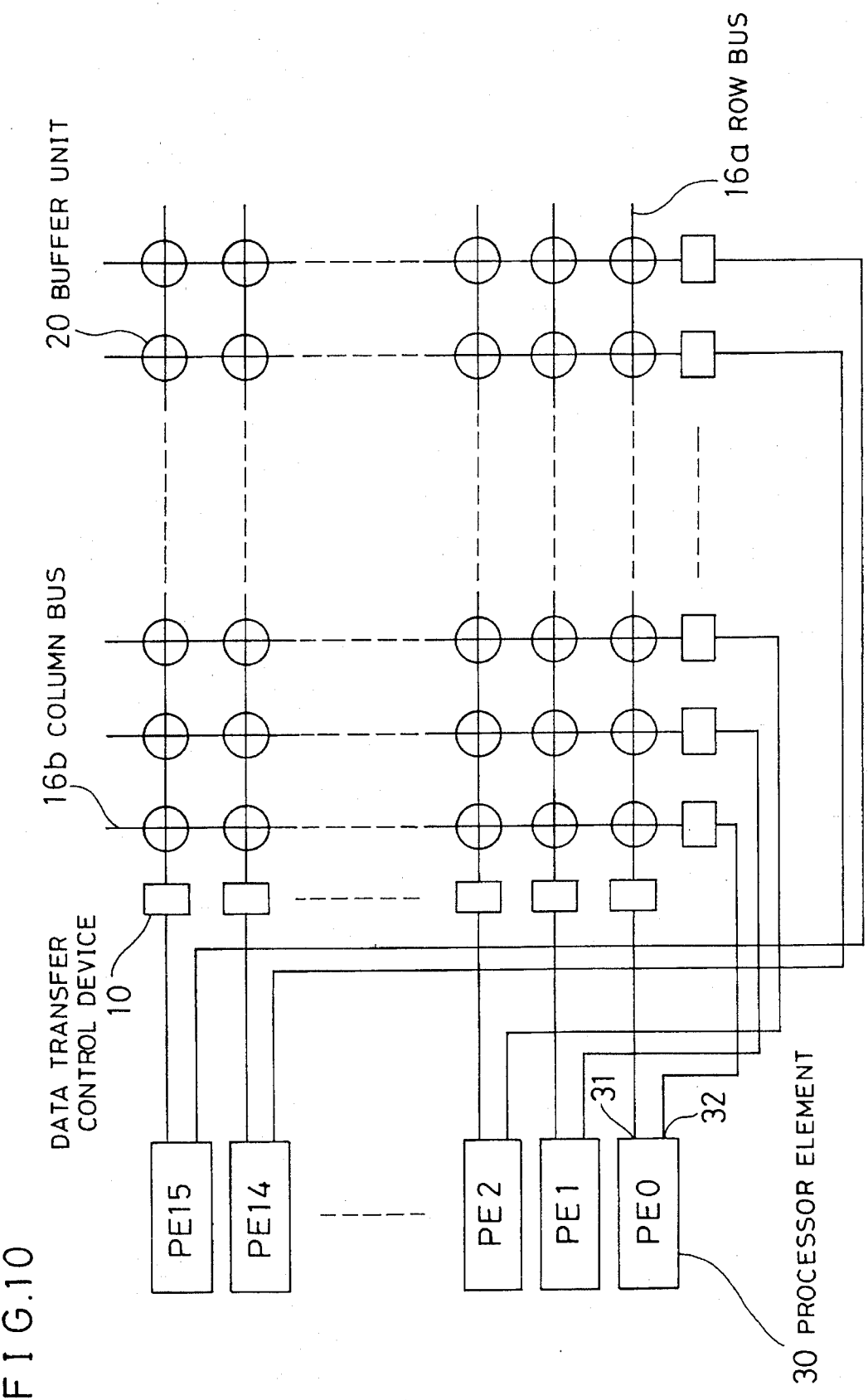
FIG. 10 is a diagram showing a construction of a multiprocessor system in which the construction of the address generation circuit in FIG. 9 is used in the data transfer control device.

FIG. 10 shows an example of tile multiprocessor system in case with 16 processor elements 30. The 16 processor elements 30 are connected to the buffer units 20 of 16×16 in number via the row buses 16a and the column buses 16b. In a parallel processing in numerical calculation such as a fluid motion analysis, three-dimensional array data expressing the state of fluid are distributed to processor elements 30, and the parallel calculation is executed exchanging data mutually among the processor elements 30.

A data distributing method is described in case where three-dimensional array data are distributed to 16 processor elements 30 to execute a parallel processing.

Figure 11A:
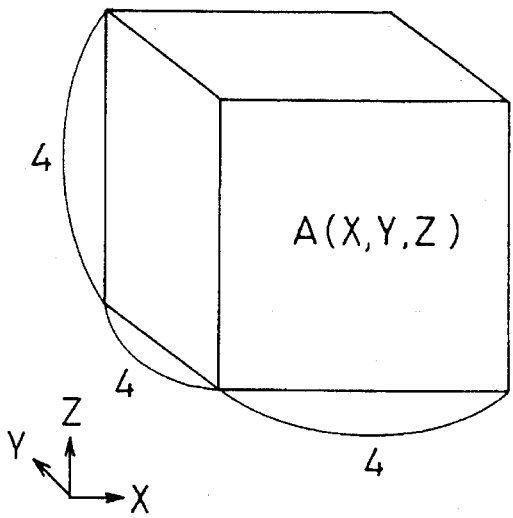
FIG. 11A is a view showing a three-dimensional array to be processed by the multiprocessor system in FIG. 10.
Figure 11B:
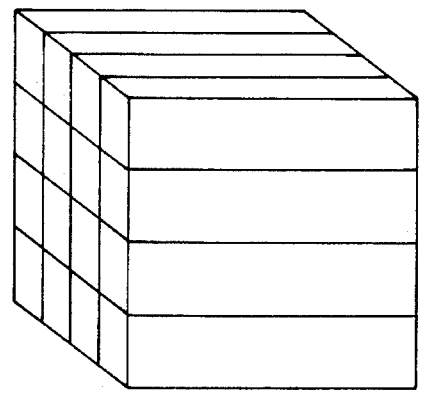
FIG. 11B is a view showing a data distribution in X direction.
Figure 11C:
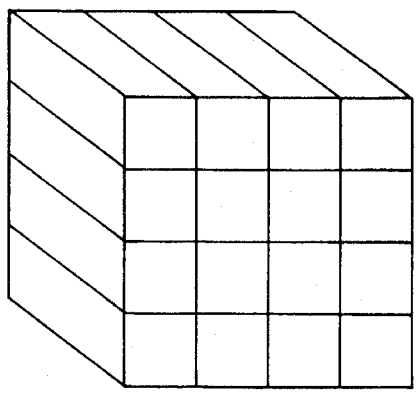
FIG. 11C is a view showing a data distribution in Y direction.
Figure 11D:
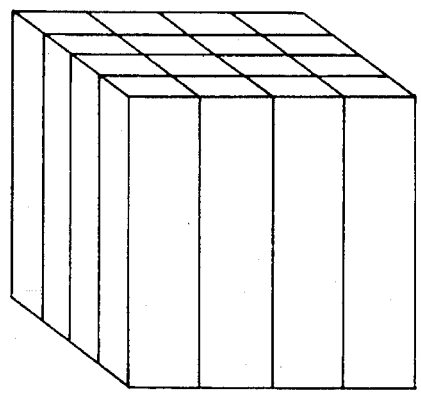
FIG. 11D is a view showing a data distribution in Z direction.

As shown in FIG. 11A, three-dimensional array of 4×4×4 is expressed as A(1:4, 1:4, 1:4). In case where the three-dimensional array A is divided into 16 one-dimensional arrays, there can be three data distributing methods. FIGS. 11B, 11C, 11D show respectively a distribution A(1:4, /1:4, 1:4/) in X direction, a distribution A(1:4/, 1:4, /1:4) in Y direction and a distribution A(/1:4, 1:4/, 1:4) in Z direction. In every case, each of the 16 one-dimensional arrays is allotted to the 16 processor elements in FIG. 10.

Figure 12:
FIG. 12 is a view showing a two-dimensional arrangement of virtual processor elements in case where the three-dimensional array in FIG. 11A is processed by the multiprocessor system in FIG. 10.
Figure 13:
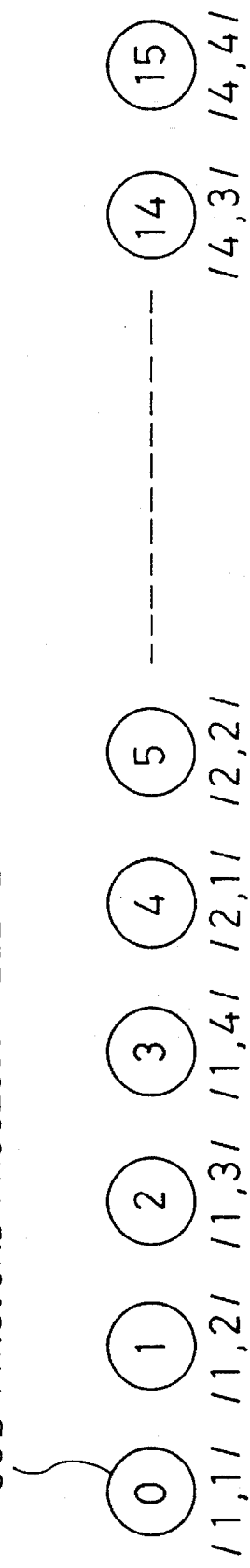
FIG. 13 is an explanatory view showing correspondence between numbers of physical processor elements and numbers of the virtual processor elements in FIG. 12.

In case of the distribution in X direction, a virtual processor element array 30a in two-dimensional arrangement as shown in FIG. 12 is supposed. For example, the one-dimensional array A(1:4, /4, 1/) are allotted to /4 and 1/ of the virtual processor element array 30a. Since the actual processor elements 30 (i.e. physical processor element) in FIG. 10 are in row in the one-dimension, it is necessary to further allot the virtual processor elements to the physical processor elements 30b according to FIG. 13. FIG. 13 shows correspondence between the numbers of the virtual processor elements and the numbers of the physical processor elements. The numbers /J, K/ of the virtual processor element in case of the distribution A(1:4,/J, K/) in X direction (J=1:4, K=1:4) is allotted to the number L of the physical processor element when L=(J−1)×4+K−1 (1≦J, K≦4).

When the thus allotted three-dimensional array is parallel-processed, change in state of the entire space region cannot be obtained by only one time calculation to the one-dimensional array within one processor element 30 (30b). In order to calculate the entire three-dimensional space region, the calculation must be conducted with the distributing directions changed sequentially. For example, an ADI method (alternating direction implicit method) in case where a partial differential equation is to be solved according to calculus of finite differences is such a calculation method.

Figure 14:
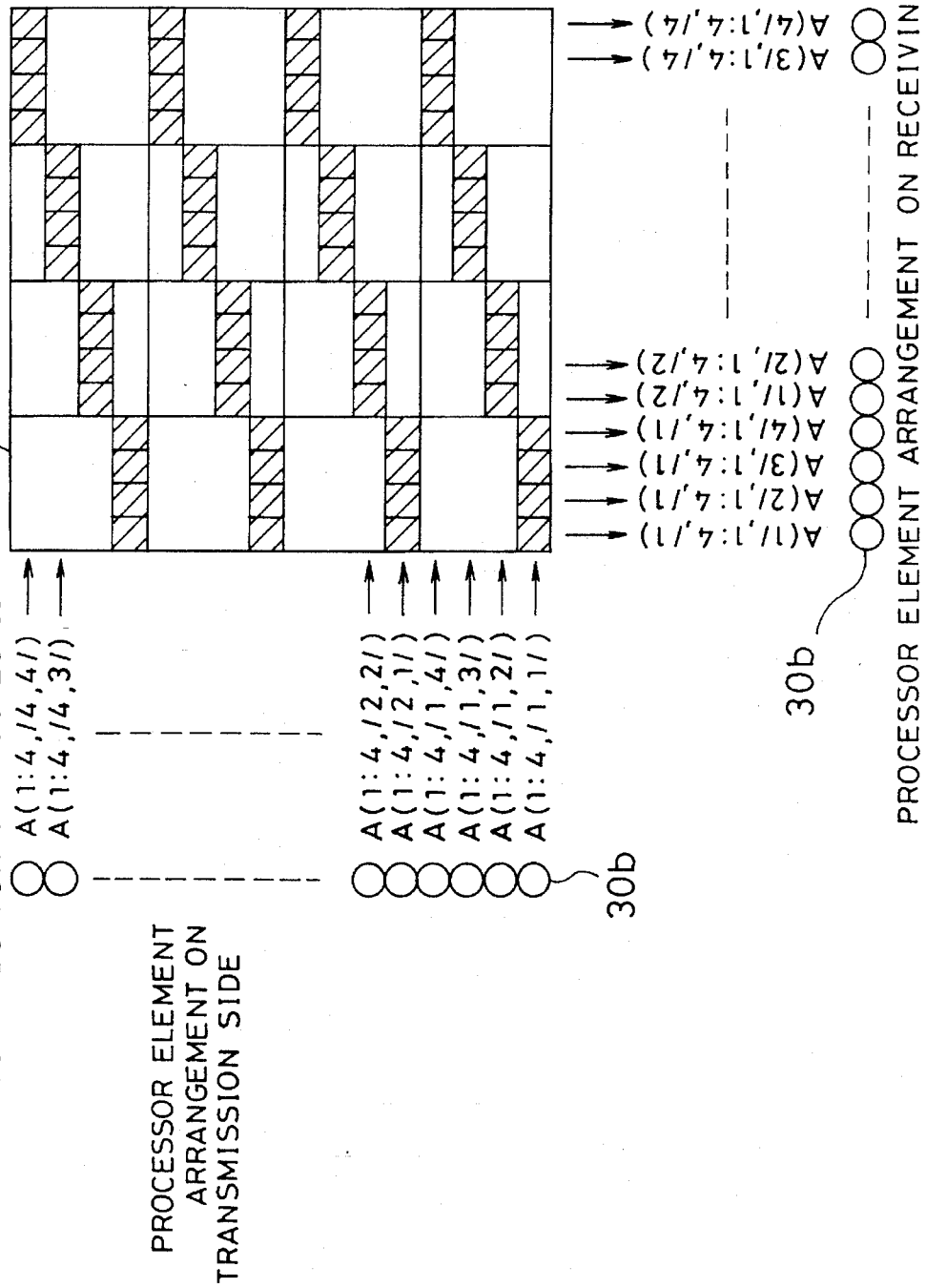
FIG. 14 is an explanatory view showing distribution and collection of data by the multiprocessor system in FIG. 10.

FIG. 14 shows a state of data transfer between the processor elements 30 (30b) in case of exchange from the distribution in X direction to the distribution in Y direction. The numbers /K, I/ of the virtual processor element in case of the distribution A(I/, 1:4, /K) in Y direction (I=1:4, K=1:4) are allotted to the number M of the physical processor element when M=(K−1)×4+I−1 (1≦I, K≦4).

First described is operation of data transfer from the 16 processor elements 30 (30b) each having one-dimensional array distributed in X direction to the buffer units 20 via the data transfer control devices 10 and the row buses 16a. For example, the one-dimensional array A(1:4, /1 ,2/) held by the physical processor element 30b of number 1 is composed of four elements A(1, 1, 2/), A(2,/1, 2/), A(3,/1, 2/), A(4,/1, 2/). At this time, the address generation circuit (FIG. 9) of the data transfer control device 10 which is connected to the physical processor element 30b of number 1 generates 4, 5, 6, 7 sequentially as buffer unit addresses A by sequential update of only the lower address latch 19b, while fixing the content of the upper address latch 19a to 1. Thereby, the four elements of the one-dimensional array A(1:4,/1, 2/) are distributed and arranged to the four buffer units 20. The data transfer from the physical processor elements 30b of the other numbers to the buffer units 20 is executed as in the same manner, with a result that all element data of the tree-dimensional array A(1:4, 1:4, 1:4) are distributed and arranged to the 64 buffer units 20.

Figure 15:
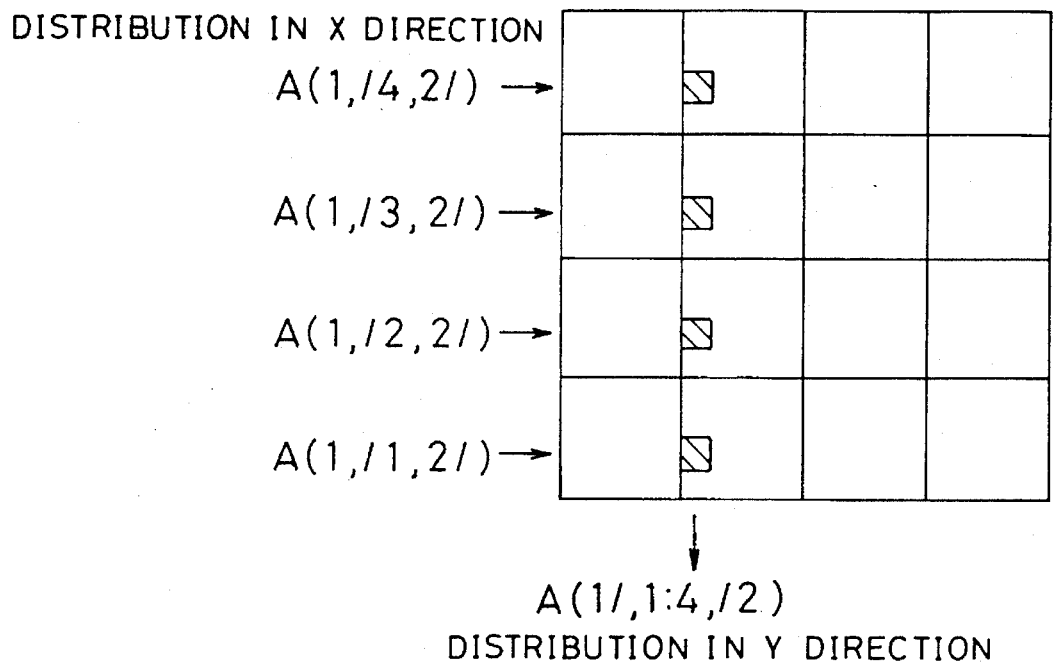
FIG. 15 is an explanatory view showing in detail data collection by one of the processor elements in FIG. 14.
Figure 16:
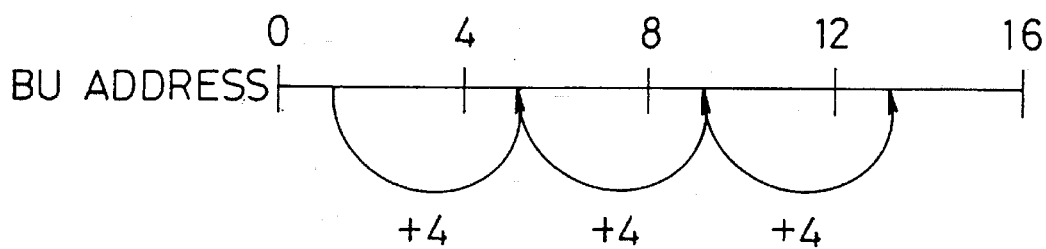
FIG. 16 is an explanatory view showing an example of generation of buffer unit address by the address generation circuit in FIG. 9.

Discussed next is the operation for transmitting data from the 64 buffer units 20 each having one element data to the 16 processor elements 30 (30b) via the data transfer control devices 10 and the column buses 16b. FIG. 15 shows a state of data transmission to the physical processor element 30b of number 4 to which the one-dimensional array A(1/, 1:4, /2) divided in Y direction is allotted. The one-dimensional array to be transmitted to the physical processor element 30b of number 4 is composed of: element data A(1,/1, 2/) transmitted from the physical processor element 30b of number 1; element data A(1, /2, 2/) transmitted from the physical processor element 30b of number 5; element data A(1,/3, 2/) transmitted from the physical processor element 30b of number and element data A(1, /4, 2/) transmitted from the physical processor element 30b of number 13. Accordingly, the address generation circuit (FIG. 9) of the data transfer control device 10 which is connected to the physical processor element 30b of number 4 generates 1, 5, 9, 13 sequentially as the buffer unit addresses A, as shown in FIG. 16, by sequential update of only the upper address latch 19a, fixing the content of the lower address latch 19b to 1. Thereby, the element data distributed and arranged in the four buffer units 20 are collected to the physical processor element of number 4. The data transfer from the buffer units 20 to the physical processor elements of the other numbers is executed in the same manner, with a result that the three-dimensional array A(1:4, 1:4, 1:4) is distributed and arranged to the 16 physical processor elements 30b with being divided in Y direction.

As discussed above, according to the address generation circuit in FIG. 9, the address is divided into an upper rank and a lower rank, thus the change in distributing directions of the three-dimensional array in the multiprocessor system can be performed with burst transfer, enabling high-speed data transfer.

If the scale of array to be handled is larger than the number of processor elements 30 (30b), one physical processor element 30b manipulates two or more virtual processor elements. At this time, the data transfer between the processor elements 30 (30b) can be performed by reciprocally using the address generation circuit in FIG. 9.

(THIRD EMBODIMENT)

In the multiprocessor system in FIG. 10, since a square root n of the total number of processor elements 30 is 2's power, the buffer unit address A is made up by allotting the output of the upper address latch 19a to the upper bits and the output of the lower address latch 19b to the lower bits in the address generation circuit in FIG. 9.

Figure 17:
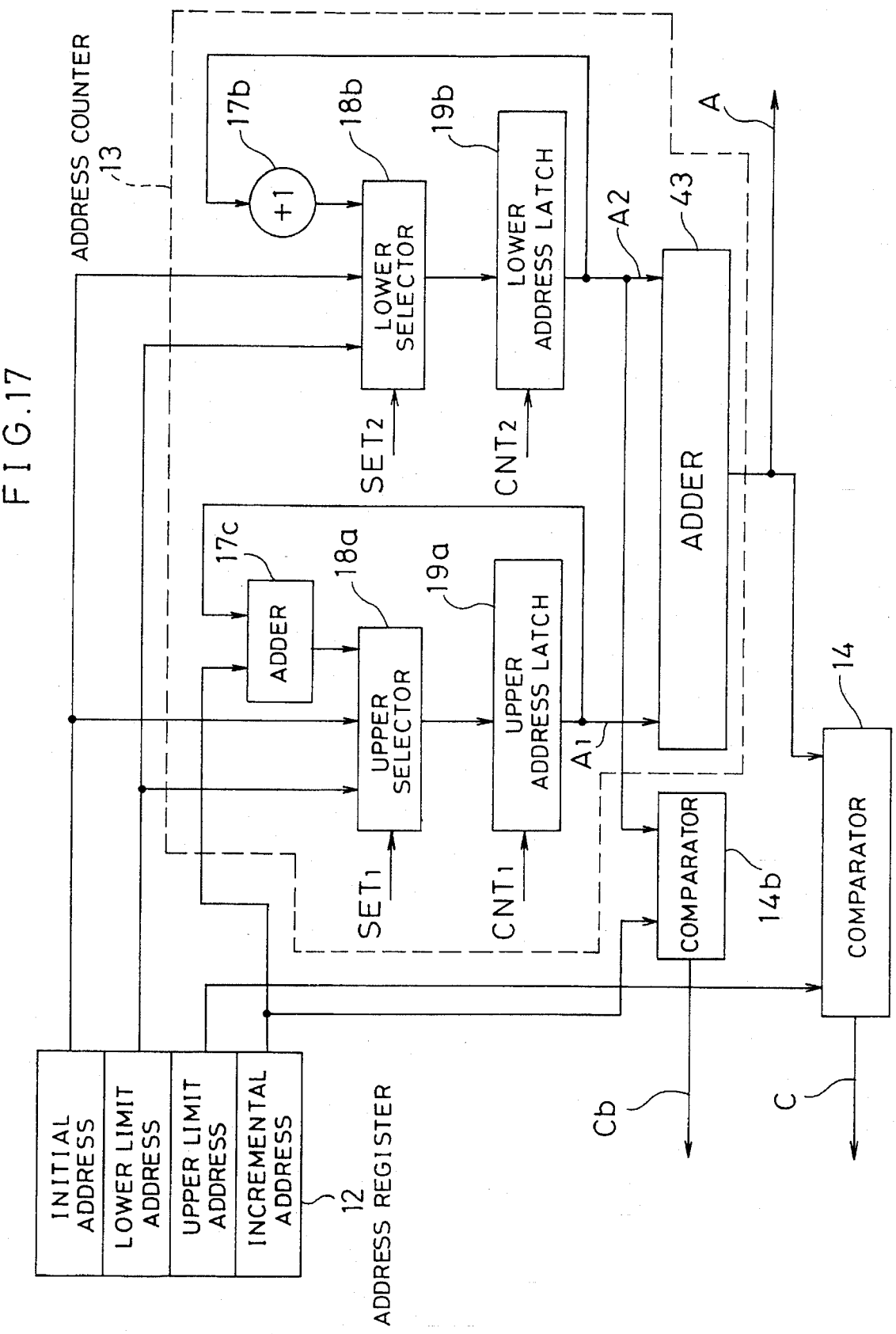
FIG. 17 is a diagram showing another modified example of the address generation circuit in FIG. 2.

Next, referring to FIG. 17, an example of the address generation circuit is described which is applicable to a case where the square root n of the total number of processor elements is not 2's power. The address counter 13 of the address generation circuit in FIG. 17 includes a first adder 17c, a +1 adder 17b, an upper selector 18a, a lower selector 18b, a four-bit upper address latch 19a, two-bit lower address latch 19b and a second adder 43. The address register 12 holds an incremental address in addition to initial, lower limit and upper limit addresses. The first adder 17c outputs an added result of an output A1 of the upper address latch 19a and the incremental address from the address register 12. The second adder 43 outputs as the buffer unit address A an added result of the output A1 of the upper address latch 19a and an output A2 of the lower address latch 19b. Then, the output A of the second adder 43 and the upper limit address from the address register 12 are inputted to a first comparator 14, and the output A2 of the lower address latch 19b and the incremental address from the address register 12 are inputted to a second comparator 14b. First and second comparators 14, 14b output respectively conformity signals C, Cb.

Figure 18:
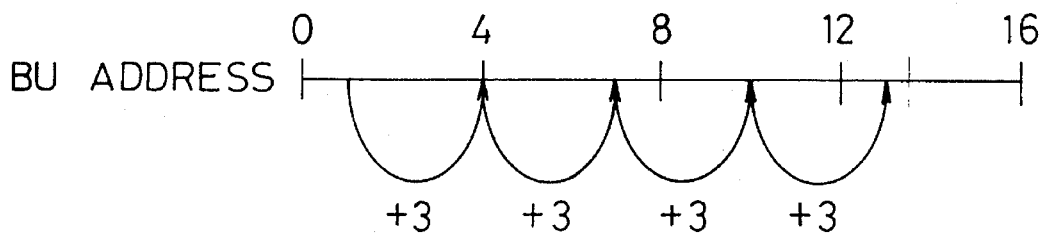
FIG. 18 is an explanatory view showing an example of generation of buffer unit address by the address generation circuit in FIG. 17.

For example, in case of data transfer of addresses 6, 7, 8 to three buffer units 20, the incremental address in the address register 12 is set to 3, and the content of the lower address latch 19b is changed by one to 0, 1, 2, while fixing the content of the upper address latch 19a to 6. Also, as shown in FIG. 18, in case of address generation for data transfer of addresses 1, 4, 7, 10, 13 from five buffer units 20, the incremental address in the address register 12 is set to 3, and the content of the upper address latch 19a is changed by 3 to 0, 3, 6, 9, 12, while fixing the content of the lower address latch 9b to 1.

As described above, in the address generation circuit in FIG. 17, the two adders 17c, 43 regarding the addresses are provided, so as to perform high-speed burst transfer even in case where the square root of the total number of processor elements is not 2's power.

(FOURTH EMBODIMENT)

Figure 19:
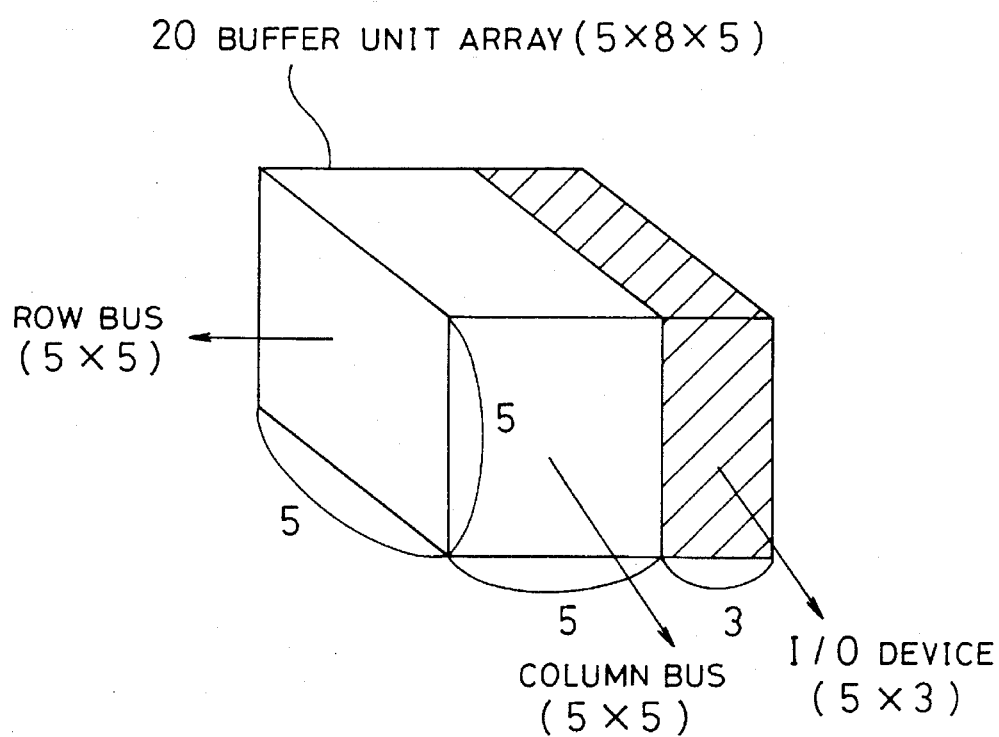
FIG. 19 is a view showing an example that the two dimensional arrangement of the buffer units in FIG. 5 is expanded to three-dimension arrangement.

Hereinafter discussed is an example of a multiprocessor system with two-dimensional arrangement of processor elements. FIG. 19 shows only buffer unit part in the system and shows a construction of five pairs of buffer units in FIG. 5 (5×8×5). 5×5 row buses and 5×5 column buses are connected to 5×5 processor elements. The other 5×3 column busses are connected to 5×3 I/O devices.

Figure 20:
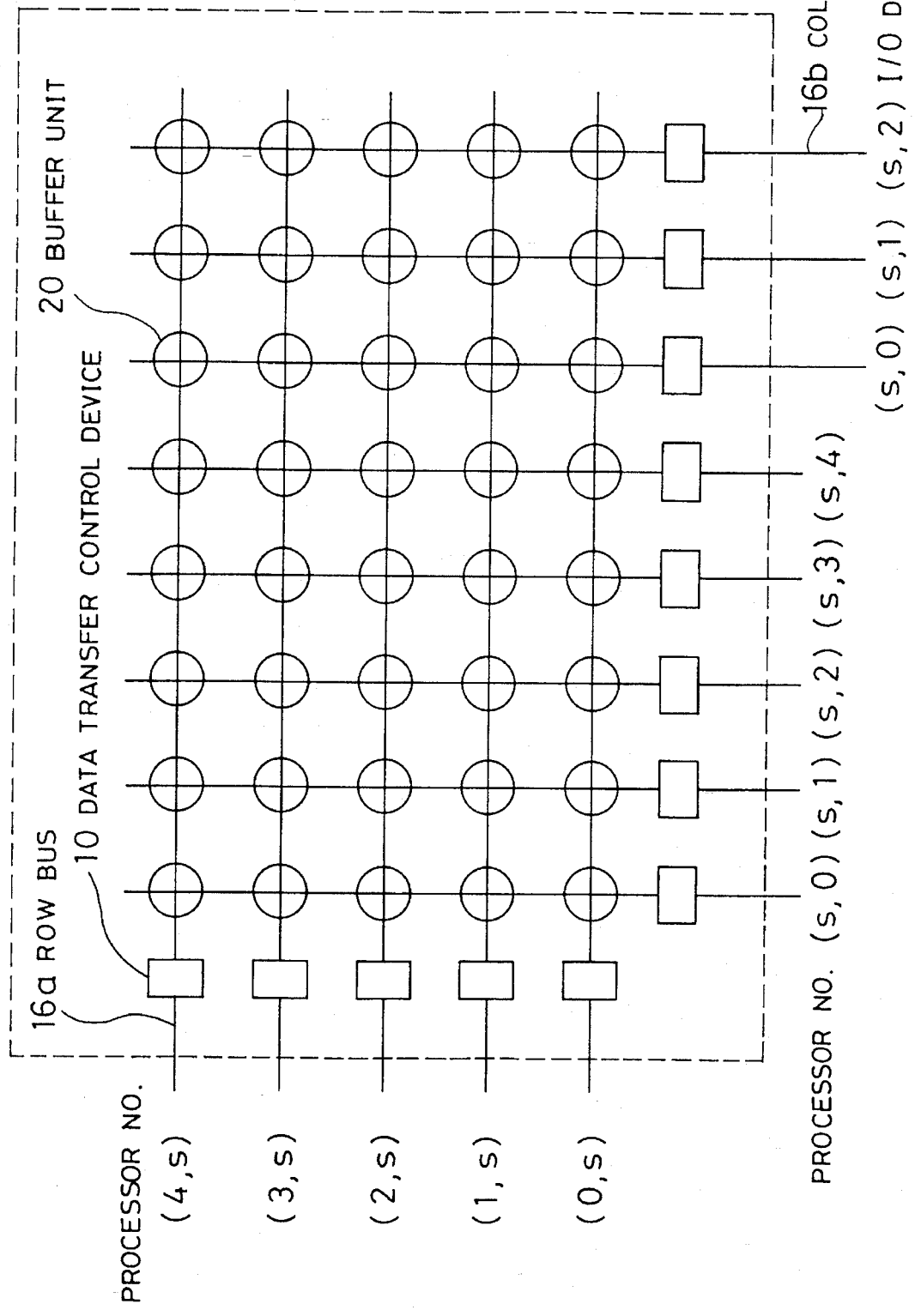
FIG. 20 is a diagram showing a connection of buffer units on an s-th surface in the multiprocessor system using the buffer units arranged in three-dimension in FIG. 19.

FIG. 20 shows connection between processor elements via 5×8 buffer units 20 on a s-th surface (0≦s≦4) and connection between the processor elements and the I/O devices. In this embodiment, first ports of five processor elements (0, s)–(4, s) within the s-th surface are respectively connected to second ports of the processor elements (s, 0)–(s, 4) on five surfaces via the row buses 16a, the data transfer control devices 10, the buffer units 20 and the column buses 16b on the s-th surface. The three I/O devices (s, 0), (s, 1), (s, 2) within the s-th surface are connected to the processor elements via the buffer units 20 in the same surface.

The multiprocessor system with the above construction can perform the data transfer between the processor elements and the data transfer between the processor elements and the I/O devices. Suppose that the total number of the processor elements is n×n (5×5=25 in the above example), the total number of buffer units required for data transfer between processor elements is n×n×n (5×5×5=125 in the above example), which means the system with rather less total number of buffer units than that required for conventional crossbar joint n×n×n×n (e.g. 5×5×5×5=625). In addition, the I/O devices can be easily connected.

Figure 21:
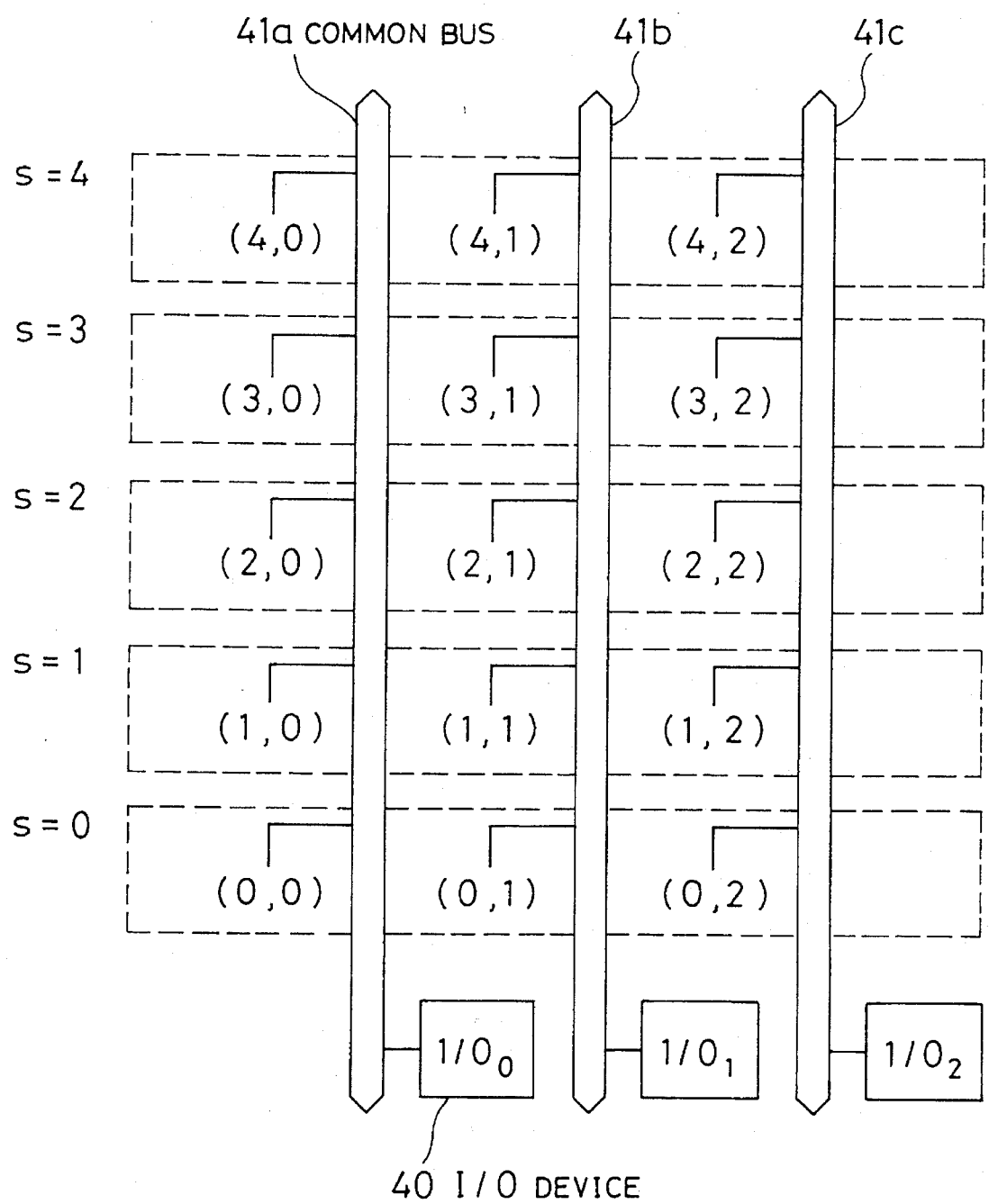
FIG. 21 is a diagram showing an example that the same common bus as in FIG. 8 is introduced into the multiprocessor system in FIGS. 19 and 20.
Figure 22:
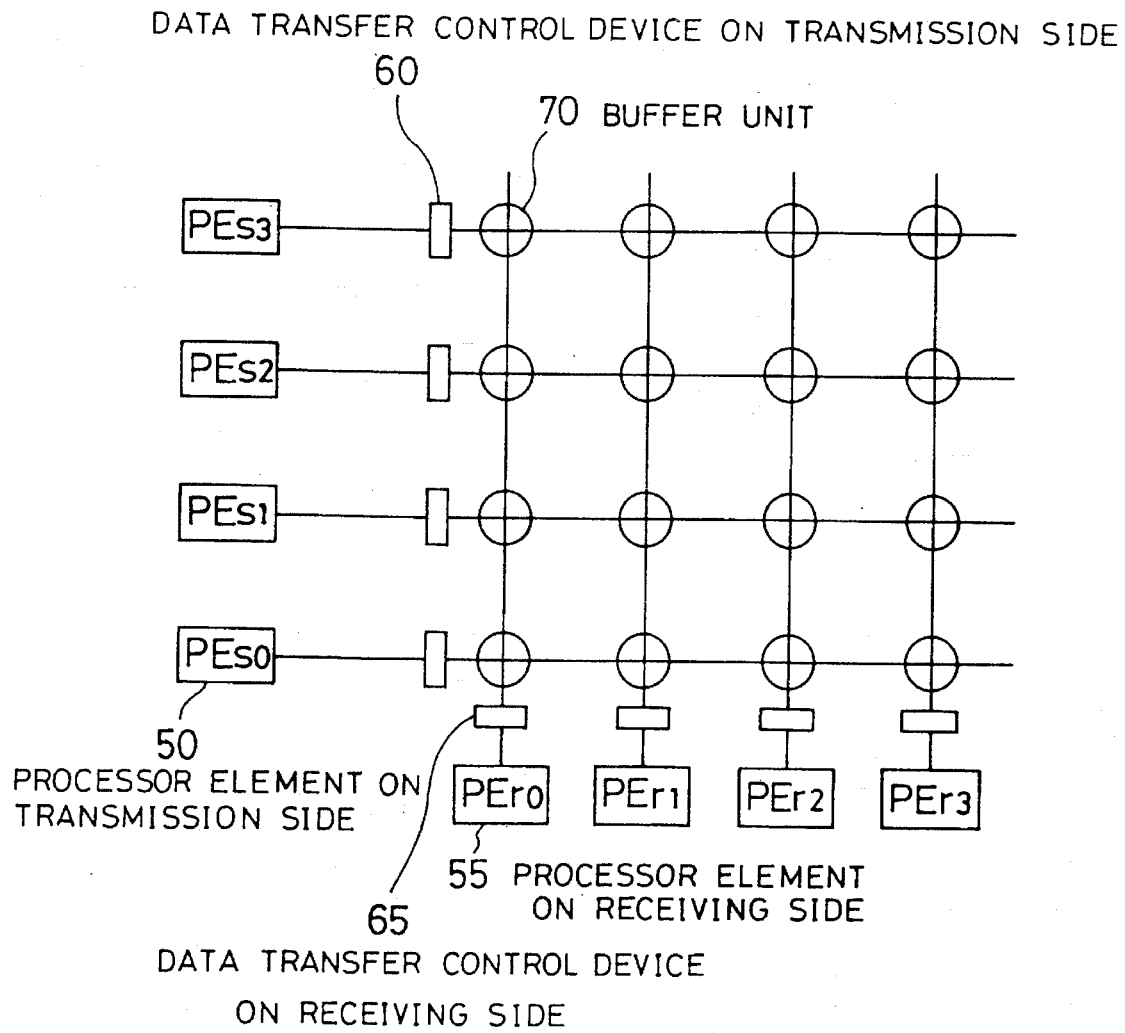
FIG. 22 is a diagram showing a construction of a conventional multiprocessor system.
Figure 23:
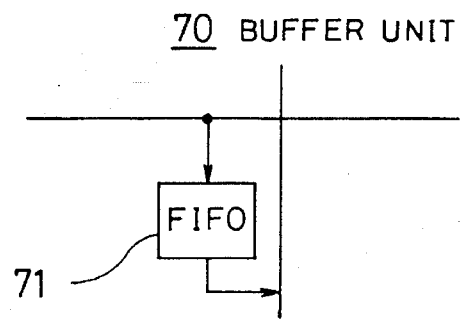
FIG. 23 is a diagram showing a construction of one of the buffer units in FIG. 22.
Figure 24:
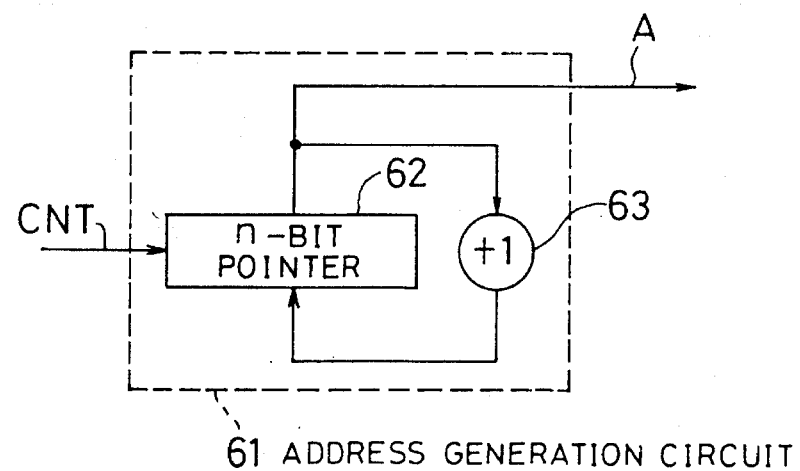
FIG. 24 is a diagram showing a construction of an address generation circuit built in a data transfer control device on transmission side in FIG. 22.
Figure 25:
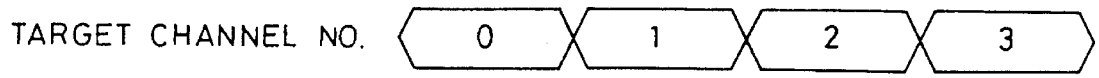
FIG. 25 is a view showing an example of generation of buffer unit address (channel number) by the address generation circuit in FIG. 24.

An example is described next that common buses for the I/O devices as shown in FIG. 8 is introduced into the multiprocessor system shown in FIGS. 19 and 20. As shown in FIG. 21, 5×3 column buses regarding the connection to the I/O devices are numbered as (s, t), (0≦s≦4 and 0≦t≦2). A first common bus 41a, a second common bus 41b and a third common bus 41c are respectively connected to a first group of column buses (0, 0)–(4, 0), a second group of column buses (0, 1)–(4, 1) and a third group of column buses (0, 2)–(4, 2). The three common buses 41a, 41b, 41c are respectively connected to the I/O devices (I/O$_0$, I/O$_1$, I/O$_2$) 40. For example, since the I/O device I/O$_0$ is connected to all row busses on all surfaces via the first common bus 41a, all processors can transfer data to and from the I/O device I/O$_0$ via the row buses. The I/O devices I/O$_1$, I/O$_2$ are as well. Further, each common bus 41a, 41b, 41c can independently increase the I/O devices in number by additional connection according to necessity.

As discussed above, by introducing the common buses for the I/O devices as shown in FIG. 21, all processor elements can use one I/O device in common. Grouping the buses makes possible data, upon defect in the I/O device on one common bus, to be inputted and outputted by the I/O device on another common bus. This lessens the influence of the defect.

I claim:

1. A data transfer device having a plurality of buffer units connected to a common data transfer bus and a data transfer control device for outputting continually onto the data transfer bus a buffer unit address for sequentially selecting buffer units in an arbitrary number out of the plural buffer units and for governing control of data transfer, via the data transfer bus, between buffer units selected by the buffer unit address, said data transfer control device comprising:

a memory means for storing a first address and a second address, said first address indicative of either an upper limit address or a lower limit address of the buffer unit address, and said second address indicative of either of the upper limit address or the lower limit address of the buffer unit address not indicated by said first address;

an update means for holding the first address provided from said memory means and for outputting the thus held first address as the buffer unit address, while sequentially updating the thus held first address;

a comparison means for outputting a conformity signal upon conformity of the buffer unit address outputted from said update means with the second address provided from said memory means; and a control means for sequentially providing an address update requirement signal to said update means so that said update means executes address update and for providing an address setting signal to said update means, upon receipt of an output of the conformity signal from said comparison means, so as to set the first address held by said memory means to said update means.

2. The data transfer device according to claim 1, wherein said memory means has a function of further holding as an initial address a third address different from first and second addresses, and said control means further has a function of setting the initial address held by said memory means to said update means prior to output of the address update requirement signal to said update means.

3. The data transfer device according to claim 1, wherein said update means has a function of independently updating an upper part and a lower part of the first address held thereby.

4. The data transfer device according to claim 1, wherein said update means includes means for adding an incremental address to the first address held hereby.

5. The data transfer device according to claim 1, wherein said data transfer control device further comprising common bus interface means intervened between the data transfer bus and a common bus which is commonly connected to a data transfer control device of at least one of the other data transfer devices and at least one data input/output device.

6. A multiprocessor system comprising: buffer units of $N^2$ in number which are respectively arranged at two-dimensional lattice points expressed by a coordinate (x, y), x, y=0–N–1 (N≧2);

first data transfer buses of N in number each of which is commonly connected to the buffer units of N in number which are arranged in X direction out of said $N^2$ buffer units;

second data transfer buses of N in number each of which is commonly connected to the buffer units of N in number which are arranged in Y direction out of said $N^2$ buffer units;

data transfer control devices of 2N in number which are connected to each of said first data transfer buses and said second data transfer buses; and processor elements of N in number each having a first data transfer port connected to one of the N data transfer control devices connected to the extreme end of the first data transfer buses out of the 2N data transfer control devices and a second data transfer port connected to one of the N data transfer control devices connected to the second data transfer buses out of the 2N data transfer control devices, wherein each of the 2N data transfer control devices includes:

memory means for holding first and second addresses for specifying a range of buffer unit address for sequentially selecting buffer units of an arbitrary number out of the N buffer units commonly connected to the data transfer control devices out of the $N^2$ buffer units;

update means for holding the first address provided from said memory means and for outputting the thus held first address as the buffer unit address, while sequentially updating the thus held first address;

comparison means for outputting a conformity signal upon conformity of the buffer unit address outputted from said update means with the second address provided from said memory means; and control means for providing sequentially an address update requirement signal to said update means so that said update means executes address update and for providing an address setting signal to said update means, upon receipt of an output of the conformity signal from said comparison means, so as to set the first address held by said memory means to said update means.

7. The multiprocessor system according to claim 6, wherein said memory means has a function of further holding as an initial address a third address different from first and second addresses, and said control means further has a function of setting the initial address held by said memory means to said update means prior to output of the address update requirement signal to said update means.

8. The multiprocessor system according to claim 6, wherein said update means has a function of independently updating an upper part and a lower part of the first address held thereby.

9. The multiprocessor system according to claim 6, wherein said update means includes means for adding an incremental address to the first address held thereby.

10. The multiprocessor system according to claim 6, further comprising:

additional buffer units of N×K (K ≧1) in number which are connected to each of said N first data transfer buses or said N second data transfer buses;

third data transfer buses of K in number which are commonly connected to said N×K additional buffer units which are arranged in Y direction or X direction out of said N×K additional buffer units; and additional data transfer control units of K in number which are connected to each of said third data transfer buses.

11. The multiprocessor system according to claim 10, further comprising at least one data input/output device connected to said K additional data transfer control devices.

12. The multiprocessor system according to claim 10, further comprising:

common buses of L in number (L≧2) which are connected to each of additional data transfer control device groups of L in number into which said K additional data transfer control devices are divided; and data input/output devices of M in number (M≧L) which are connected by at least one to each of said L common buses.

13. The multiprocessor system according to claim 10, wherein each of said K additional data transfer control devices comprises:

additional memory means for holding first and second addresses for specifying a range of the buffer unit address for sequentially selecting additional buffer units of an arbitrary number out of the N buffer units commonly connected to said additional data transfer control devices out of said N×K additional buffer units;

additional update means for holding the first address provided from said additional memory means and for outputting the thus held first address as the buffer unit address, while sequentially updating the thus held first address;

additional comparison means for outputting a conformity signal upon conformity of the buffer unit address outputted from said additional update means with the second address provided from said additional memory means; and additional control means for sequentially providing an address update requirement signal to said additional update means so that said additional update means executes address update and for providing an address setting signal to said additional update means, upon receipt of the conformity signal from said additional comparison means, so as to set tile first address held by said additional memory means to said additional update means.

14. The multiprocessor system according to claim 13, wherein said additional memory means has a function of further holding as an initial address a third address different from first and second addresses, and said additional control means further has a function of setting the initial address held by said additional memory means to said additional update means prior to output of the address update requirement signal to said additional update means.

15. The multiprocessor system according to claim 13, wherein said additional update means has a function of independently updating an upper part and a lower part of the first address held thereby.

16. The multiprocessor system according to claim 13, wherein said additional update means includes means for adding an incremental address to the first address held thereby.

17. The multiprocessor system according to claim 13, wherein each of said K additional data transfer control devices further includes common bus interface means intervened between one of said third data transfer busses and a common bus commonly connected to at least one of the other additional data transfer control devices and at least one data input/output device.

18. A multiprocessor system comprising:

buffer units of $N^3$ in number which are respectively arranged at lattice points of three-dimension expressed by a coordinate (x, y, z), x, y, z=0–N–1 (N≧2);

first data transfer buses of $N^2$ in number each of which is commonly connected to the N buffer units arranged in X direction out of the $N^3$ buffer units;

second data transfer buses of $N^2$ in number each of which is commonly connected to the N buffer units arranged in Y direction out of the $N^3$ buffer units;

data transfer control devices of $2N^2$ in number which are connected to each of said first data transfer busses and said second data transfer buses; and processor elements of $N^2$ in number each having a first data transfer port connected to one of the $N^2$ data transfer control devices connected to said first data transfer buses out of the $2N^2$ data transfer control devices and a second data transfer port connected to one of the $N^2$ data transfer control devices connected to said second data transfer buses out of the $2N^2$ data transfer control devices, wherein each of said $2N^2$ data transfer control devices includes:

memory means for holding first and second addresses for specifying a range of a buffer unit address for sequentially selecting buffer units of an arbitrary number out of the N buffer units commonly connected to said data transfer control devices out of the $N^3$ buffer units;

update means for holding the first address provided from said memory means and for outputting the thus held first address as the buffer unit address, while sequentially updating the thus held first address;

comparison means for outputting a conformity signal upon conformity of the buffer unit address outputted from said update means with the second address provided from said memory means; and control means for sequentially providing an address update requirement signal to said update means so that said update means executes address update and for providing an address setting signal to said update means, upon receipt of the conformity signal from said comparison means, so as to set the first address held by said memory means to said update means.

19. The multiprocessor system according to claim 18, wherein said memory means has a function of further holding as an initial address a third address different from first and second addresses, and said control means further has a function of setting the initial address held by said memory means to said update means prior to output of the address update requirement signal to said update means.

20. The multiprocessor system according to claim 18, wherein said update means has a function of independently updating an upper part and a lower part of the first address held thereby.

21. The multiprocessor system according to claim 18, wherein said update means includes means for adding an incremental address to the first address held thereby.

22. The multiprocessor system according to claim 18, further comprising:

additional buffer units of $N^2 \times K$ ($K \geq 1$) in number which are connected to each of said $N^2$ first data transfer buses or said $N^2$ second data transfer buses;

third data transfer buses of $N \times K$ in number each of which is commonly connected to the N additional buffer units arranged in Y direction or X direction out of the $N^2 \times K$ additional buffer units; and additional data transfer control devices of $N \times K$ in number which are connected to each of said third data transfer buses.

23. The multiprocessor system according to claim 22, further comprising at least one data input/output device connected to the $N \times K$ additional data transfer control devices.

24. The multiprocessor system according to claim 22, further comprising:

common buses of L in number which are connected to each of additional data transfer control device groups of L in number ($L \leq 2$) into which the $N \times K$ additional data transfer control devices are divided; and data input/output devices of M in number ($M \geq L$) connected by at least one to each of said L common buses.

25. The multiprocessor system according to claim 22, wherein each of said $N \times K$ additional data transfer control devices includes:

additional memory means for holding first and second addresses for specifying a range of a buffer unit address for sequentially selecting the additional buffer units of an arbitrary number out of the N buffer units commonly connected to said additional data transfer control devices out of said $N^2 \times K$ additional buffer units;

additional update means for holding the first address provided from said additional memory means and for outputting the thus held first address as the buffer unit address, while sequentially updating the thus held first address;

additional comparison means for outputting a conformity signal upon conformity of the buffer unit address outputted frown said additional update means with the second address provided from said additional memory means; and additional control means for sequentially providing an address update requirement signal to said additional update means so that the additional update means executes address update and for providing an address setting signal to said additional update means, upon receipt of the conformity signal from said additional comparison means, so as to set the first address held by said additional memory means to said additional update means.

26. The multiprocessor system according to claim 25, wherein said additional memory means has a function of further holding as an initial address a third address different from first and second addresses, and said additional control means further has a function of setting the initial address held by said additional memory means to said additional update means prior to output of the address update requirement signal to said additional update means.

27. The multiprocessor system according to claim 25, wherein said additional update means has a function of independently updating an upper part and a lower part of the first address held thereby.

28. The multiprocessor system according to claim 25, wherein said additional update means includes means for adding an incremental address to the first address held thereby.

29. The multiprocessor system according to claim 25, wherein each of said $N \times K$ additional data transfer control devices includes common bus interface means intervened between at least one of said third data transfer buses and a common bus commonly connected to at least one of the other additional data transfer control devices and at least one data input/output device.

* * * * *

UNITED STATES PATENT AND TRADEMARK OFFICE
CERTIFICATE OF CORRECTION

PATENT NO. : 5,513,364
DATED : April 30, 1996
INVENTOR(S) : Nishikawa

It is certified that error appears in the above-identified patent and that said Letters Patent is hereby corrected as shown below:

Column 7, line 34, change "A(1,1,2/)," to --A(1,/1,2/),--.

Signed and Sealed this

Fourteenth Day of March, 2000

Attest:

Q. TODD DICKINSON

*Attesting Officer*  *Commissioner of Patents and Trademarks*

UNITED STATES PATENT AND TRADEMARK OFFICE
CERTIFICATE OF CORRECTION

PATENT NO. : 5,513,364
DATED : April 30, 1996
INVENTOR(S) : Nishikawa

It is certified that error appears in the above-identified patent and that said Letters Patent is hereby corrected as shown below:

Column 2, line 52, change "unit:" to --unit--.

Column 3, line 57, change "present:" to --present--.

Column 4, line 15, change "and the" to --the--; and
line 39, change "to the" to --the--.

Column 6, line 42, change "tile" to --the--.

Column 7, line 34, change "A(1,1,2/)," to --A(1,/2,2/),--; and
line 61, change "number" to --number 9;--.

Column 12, line 15, change "tile" to --the--.

Column 13, line 56, change ""(L $\leq$ 2)" to --(L $\geq$ 2)--.

Column 14, line 19, change "frown" to --from--.

Signed and Sealed this

Fifteenth Day of August, 2000

Attest:

Q. TODD DICKINSON

*Attesting Officer*      *Director of Patents and Trademarks*